(12) United States Patent
Maekawa

(10) Patent No.: US 10,942,626 B2
(45) Date of Patent: Mar. 9, 2021

(54) DISPLAY THAT SCROLLS TO RELATED SETTING CONTROL ICONS

(71) Applicant: FUJI XEROX CO., LTD., Tokyo (JP)

(72) Inventor: Takao Maekawa, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 16/590,472

(22) Filed: Oct. 2, 2019

(65) Prior Publication Data

US 2020/0379612 A1 Dec. 3, 2020

(30) Foreign Application Priority Data

May 27, 2019 (JP) .............................. JP2019-098576

(51) Int. Cl.
*G06F 3/0482* (2013.01)
*G06F 3/0485* (2013.01)
*G06F 3/12* (2006.01)

(52) U.S. Cl.
CPC .......... *G06F 3/0482* (2013.01); *G06F 3/0485* (2013.01); *G06F 3/1253* (2013.01)

(58) Field of Classification Search
None
See application file for complete search history.

(56) References Cited

U.S. PATENT DOCUMENTS

| 9,736,286 | B2* | 8/2017 | Kennedy | G06F 3/0482 |
| 2007/0124695 | A1* | 5/2007 | Brodie | G06F 16/9038 |
| | | | | 715/781 |
| 2008/0150892 | A1* | 6/2008 | Duhig | G06F 16/54 |
| | | | | 345/156 |
| 2008/0235617 | A1* | 9/2008 | Kim | G06F 3/04855 |
| | | | | 715/786 |
| 2012/0069396 | A1* | 3/2012 | Tomiyasu | G06F 3/0488 |
| | | | | 358/1.15 |
| 2015/0095848 | A1* | 4/2015 | Sugimoto | G06F 3/0485 |
| | | | | 715/784 |
| 2015/0286357 | A1* | 10/2015 | Penha | G06F 3/0485 |
| | | | | 715/830 |
| 2016/0088176 | A1* | 3/2016 | Maekawa | H04N 1/0097 |
| | | | | 358/1.15 |
| 2016/0124598 | A1* | 5/2016 | Yamahara | G06F 3/0482 |
| | | | | 715/830 |

(Continued)

FOREIGN PATENT DOCUMENTS

| CN | 102053803 A | * | 5/2011 | ........... G06F 3/1253 |
| JP | 2009009255 A | * | 1/2009 | |
| JP | 2018-101236 | | 6/2018 | |

OTHER PUBLICATIONS

Machine translation of JP2009009255A, originally published Jan. 15, 2009, retrieved from [IP.com] on [Jul. 13, 2020]. 10 pages. (Year: 2009).*

*Primary Examiner* — Amy M Levy
(74) *Attorney, Agent, or Firm* — Oliff PLC

(57) ABSTRACT

A display control device includes: an obtaining unit that, when part of a list in which multiple items are arranged in order is displayed on a display, and an operation is performed on a target item included in the multiple items, obtains operational information indicating the operation; and a scroll unit that, when the operational information is obtained, scrolls the list to preferentially display one or more related items related to the target item of the multiple items.

20 Claims, 19 Drawing Sheets

(56) References Cited

U.S. PATENT DOCUMENTS

| | | | |
|---|---|---|---|
| 2017/0124988 A1* | 5/2017 | Mitsui | G06F 3/04855 |
| 2017/0208193 A1* | 7/2017 | Shinohara | G06F 3/1279 |
| 2018/0032215 A1* | 2/2018 | Rao | G06F 3/0482 |
| 2018/0314414 A1* | 11/2018 | Miyamoto | G06F 3/0482 |
| 2018/0316805 A1* | 11/2018 | Hanada | H04N 1/00413 |
| 2019/0079985 A1* | 3/2019 | Borisova | G06F 16/26 |
| 2020/0272312 A1* | 8/2020 | Kanazawa | G06F 3/0482 |

\* cited by examiner

FIG. 2

| GROUP | SETTING ITEMS | RELATED ITEMS |
|---|---|---|
| COMMON | FILE FORMAT   PDF | SETTING ITEMS RELATED TO PDF FORMAT OF THE SAME GROUP<br>SETTING ITEMS OF PDF SECURITY GROUP |
| COMMON | . . . | . . . |
| PDF SECURITY | ENABLED | OTHER SETTING ITEMS OF THE SAME GROUP |
| PDF SECURITY | . . . | . . . |
| PDF SECURITY | AUTHORIZATION PASSWORD | AUTHORIZATION   PRINTING IS PERMITTED<br>AUTHORIZATION   CHANGE IS PERMITTED<br>AUTHORIZATION   COPYING IS PERMITTED<br>AUTHORIZATION   ACCESS IS PERMITTED |
| PDF SECURITY | . . . | . . . |
| PDF SECURITY | AUTHORIZATION COPYING IS PERMITTED | AUTHORIZATION   PASSWORD<br>AUTHORIZATION   COPYING IS PERMITTED<br>AUTHORIZATION   CHANGE IS PERMITTED<br>AUTHORIZATION   ACCESS IS PERMITTED |
| PDF SECURITY | . . . | . . . |
| CHARACTER RECOGNITION (OCR) | ENABLED | OTHER SETTING ITEMS OF THE SAME GROUP |
| CHARACTER RECOGNITION (OCR) | . . . | . . . |
| COPY AUTHORIZATION | . . . | . . . |
| SCAN AUTHORIZATION | . . . | . . . |
| SCAN AUTHORIZATION | MAIL TRANSMISSION | OTHER SETTING ITEMS OF THE SAME GROUP |
| SCAN AUTHORIZATION | USB STORAGE | OTHER SETTING ITEMS OF THE SAME GROUP |
| SCAN AUTHORIZATION | . . . | . . . |
| . . . | . . . | . . . |

| OUTPUT FILE FORMAT | |
|---|---|
| FILE FORMAT | PDF |
| COMPRESSION FORMAT | USER DESIGNATION |
| COMPRESSION OF MONOCHROME PAGES | MMR |
| COMPRESSION OF GRAYSCALE/COLOR PAGES | JPEG |
| HIGH COMPRESSION (MRC) | NOT APPLIED |
| PAGE-BY-PAGE DIVISION | [ III ] |
| OPTIMIZED FOR Web DISPLAY | [ III ] |
| PDF SECURITY | |
| ENABLED | [ III ] |
| CRYPTOGRAPHIC ALGORITHM | 256-bit AES |
| PASSWORD FOR DOCUMENT OPENING | NO SETTING |
| AUTHORIZATION | [ III ] |
| AUTHORIZATION – PASSWORD | NO SETTING |
| AUTHORIZATION – PRINTING IS PERMITTED | [ III ] |
| AUTHORIZATION – CHANGE IS PERMITTED | [ III ] |
| AUTHORIZATION – COPYING IS PERMITTED | [ III ] |
| AUTHORIZATION – ACCESS IS PERMITTED | [ III ] |
| CHARACTER RECOGNITION (OCR) | |
| ENABLED | [ III ] |
| LANGUAGE TO BE CHARACTER-RECOGNIZED | JAPANESE |
| COMPRESSION OF CHARACTER PORTION | None |

[ CANCEL ]  [ OK ]

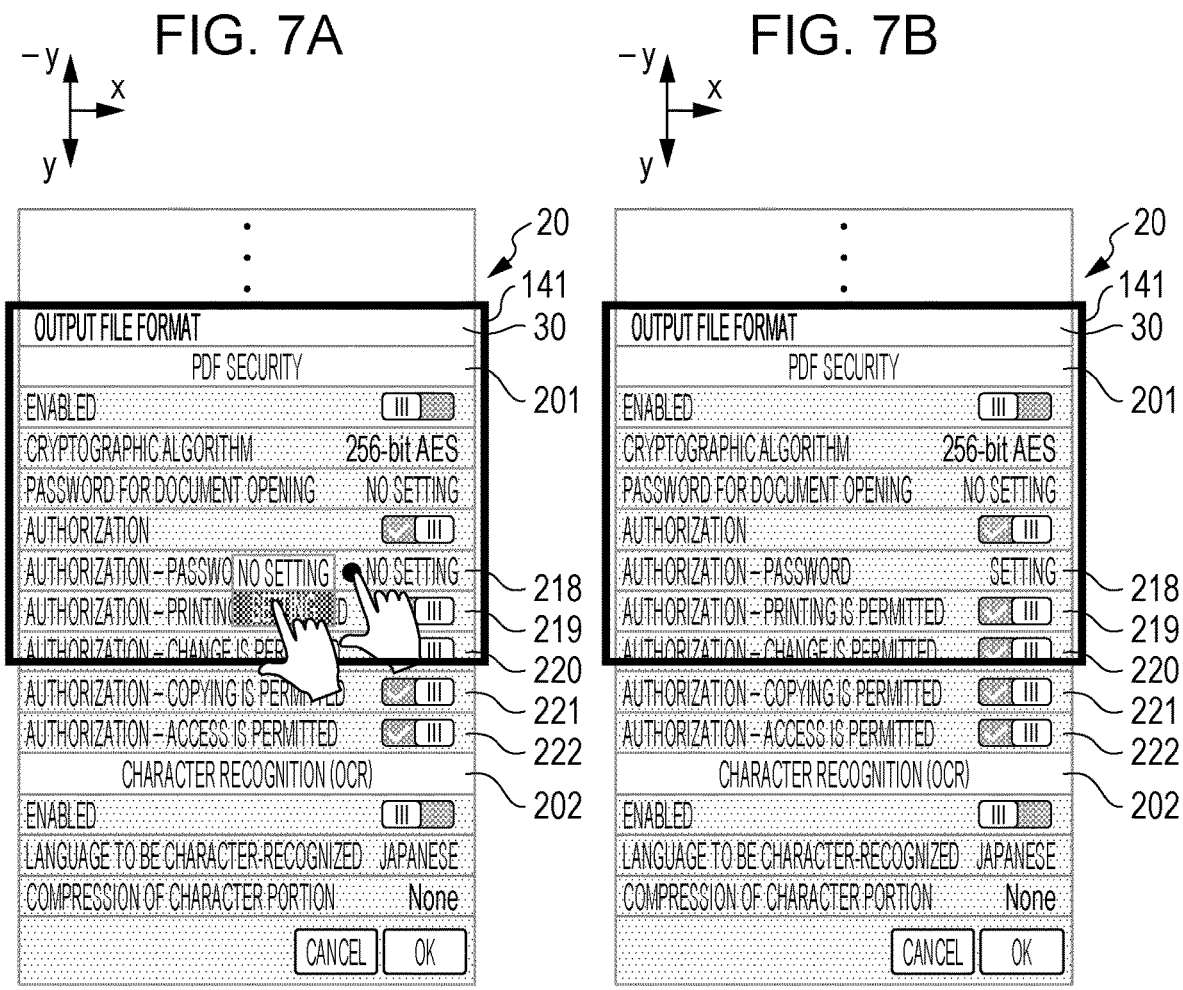

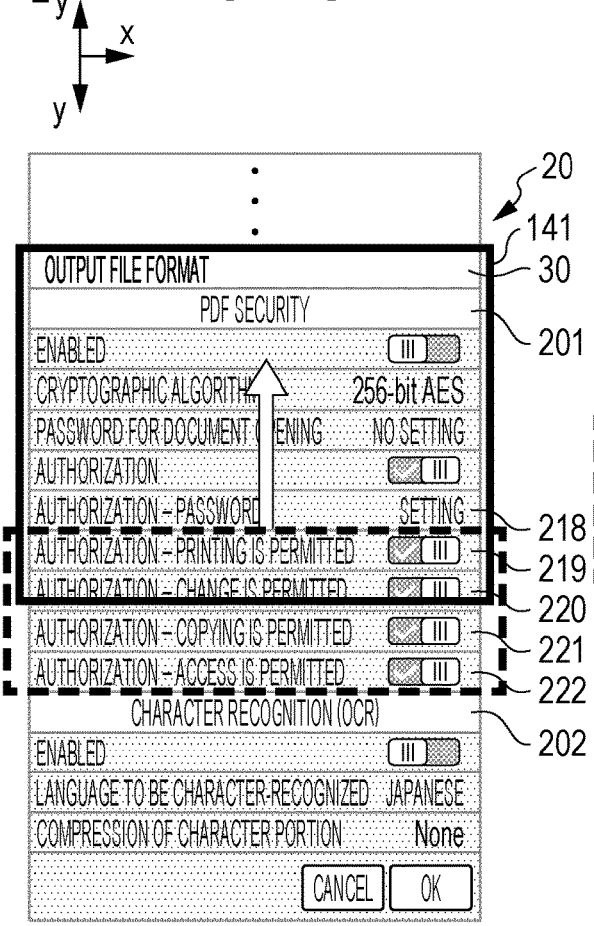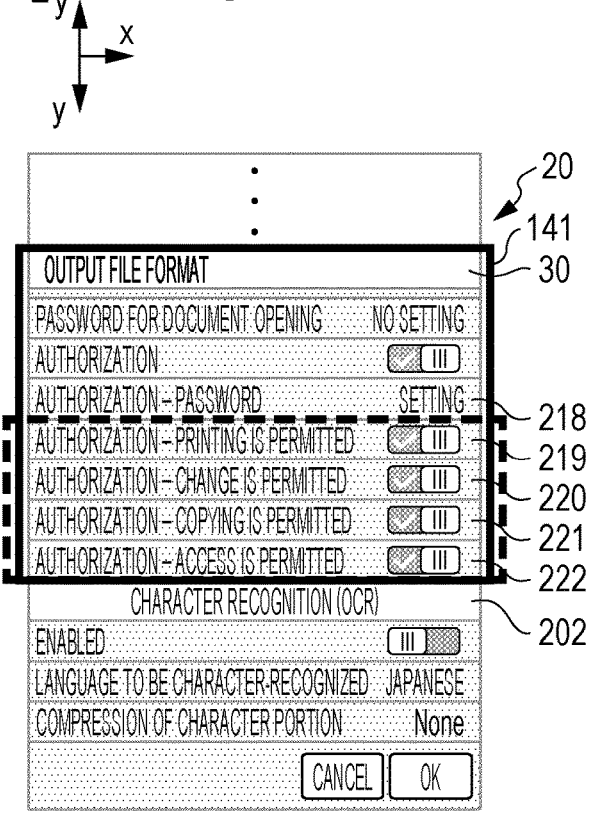

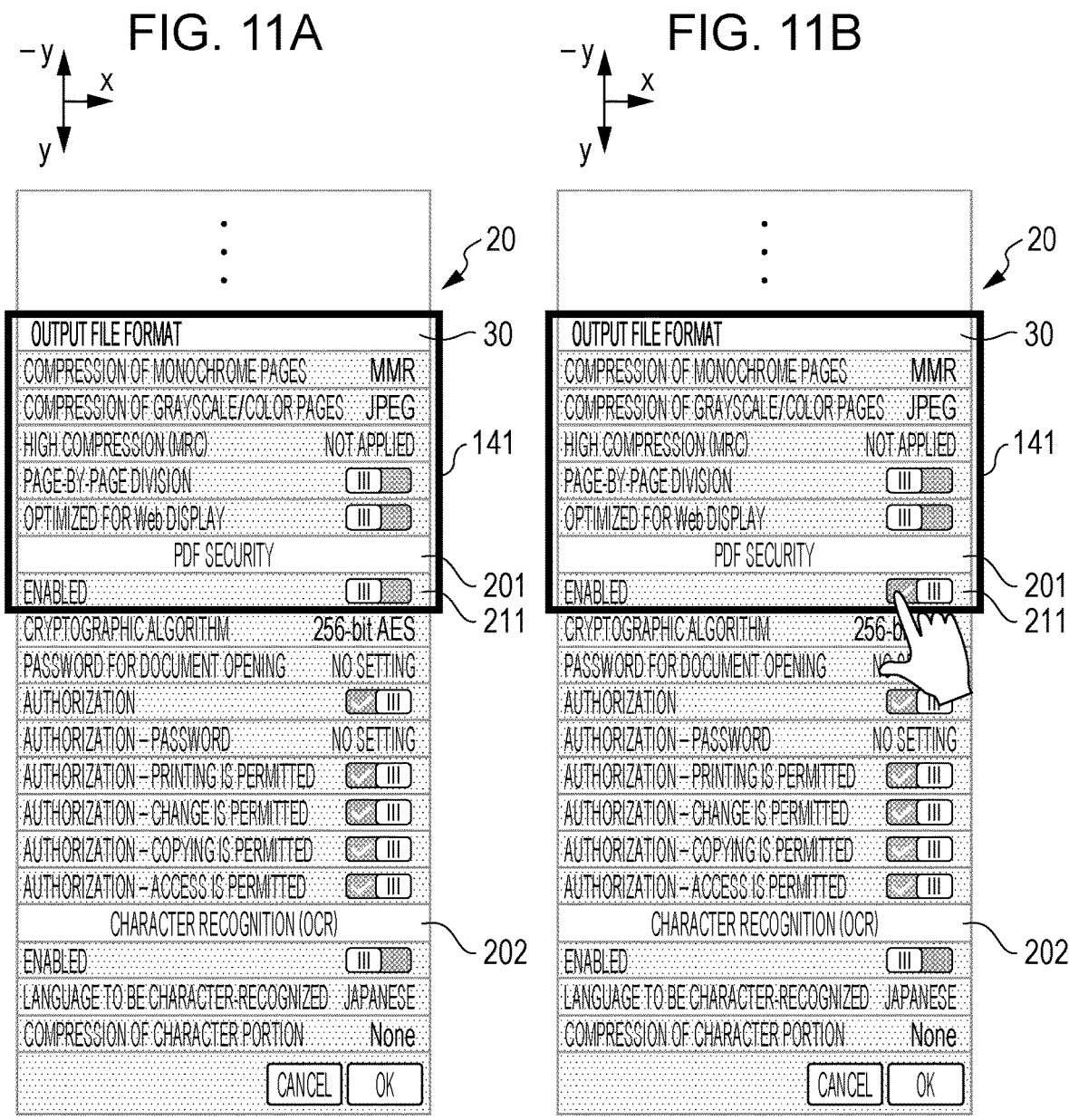

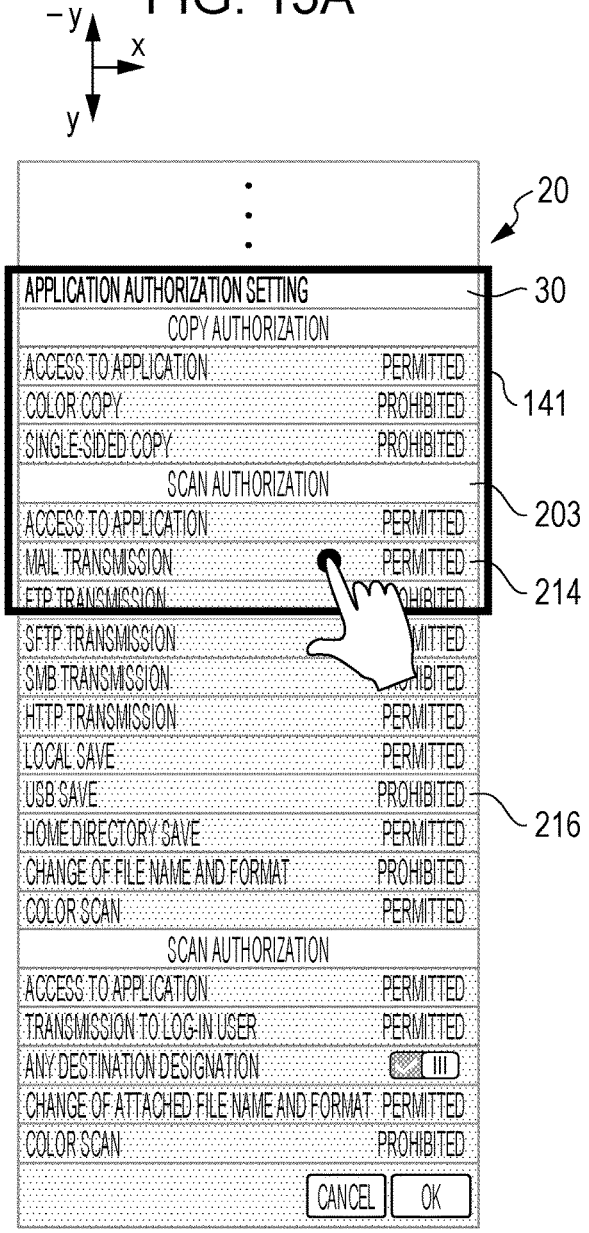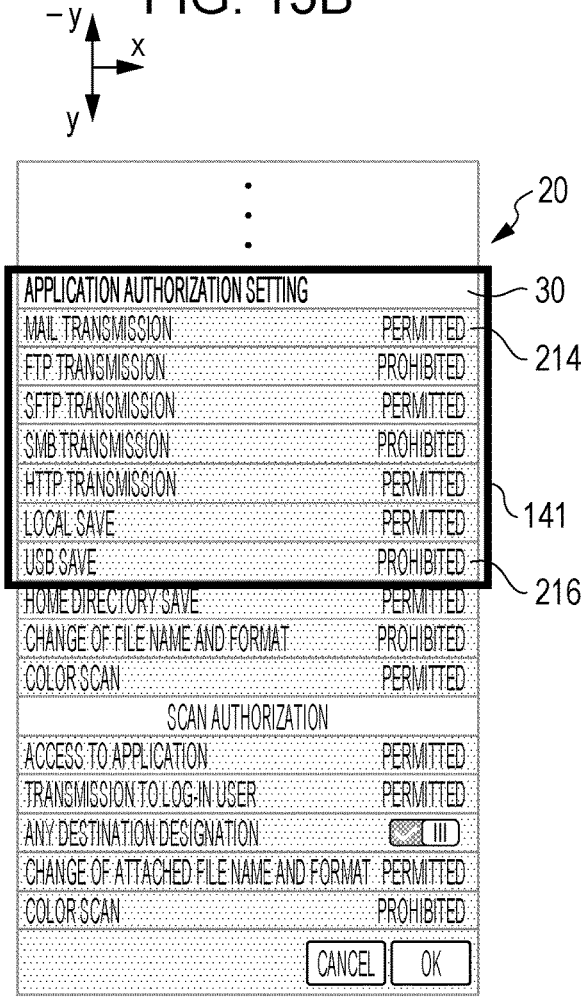

DISPLAY THAT SCROLLS TO RELATED SETTING CONTROL ICONS

CROSS-REFERENCE TO RELATED APPLICATIONS

This application is based on and claims priority under 35 USC 119 from Japanese Patent Application No. 2019-098576 filed May 27, 2019.

BACKGROUND

(i) Technical Field

The present disclosure relates to a display control device and a display device.

(ii) Related Art

A technique is known which displays various items such as input items and/or setting items on a screen, and receives an operation for these items. For instance, Japanese Unexamined Patent Application Publication No. 2018-101236 describes a technique that displays a data input screen, and when input data includes an error, picks up and displays only erroneous items.

SUMMARY

In some cases, multiple items are displayed in a list format. In those cases, for instance, when an item in a list has other related items included in the list, an operation of the item is preferably followed by an operation of the related items. However, for instance, when the list is long and related items are hidden, in order to operate the related items, an operation to scroll the list needs to be first performed to search for the related items. In this situation, it is not easy to accurately perform an operation to scroll the list to a position where the related items are displayed. As a result, a problem arises in that it is difficult to perform an operation on the related items.

Aspects of non-limiting embodiments of the present disclosure relate to provide a display control device that, when an operation for a target item is performed, facilitates searching for the items related to the target item in the list displayed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a display control device including: an obtaining unit that, when part of a list in which a plurality of items are arranged in order is displayed on a display, and an operation is performed on a target item included in the plurality of items, obtains operational information indicating the operation; and a scroll unit that, when the operational information is obtained, scrolls the list to preferentially display one or more related items related to the target item of the plurality of items.

BRIEF DESCRIPTION OF THE DRAWINGS

Exemplary embodiments of the present disclosure will be described in detail based on the following figures, wherein:

FIG. 2 is a table illustrating an example of an item table;

FIG. 3 is a view illustrating an example of a list displayed on a display;

FIGS. 7A to 7D are views illustrating an example of screen transition of the list according to the first operation example;

FIGS. 9A and 9B are views illustrating another example of screen transition of the list according to the first operation example;

FIGS. 11A to 11D are views illustrating an example of screen transition of a list according to the second operation example;

FIGS. 15A to 15D are views illustrating an example of screen transition of a list according to the third operation example;

DETAILED DESCRIPTION

1. Configuration

Figure 1:
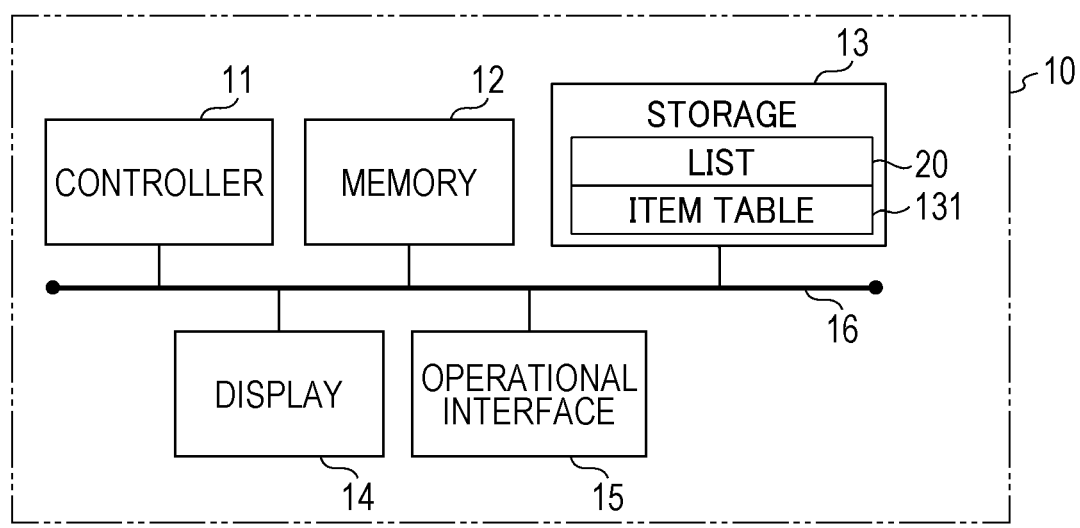
FIG. 1 is a diagram illustrating a hardware configuration of a display device.

FIG. 1 is a diagram illustrating a hardware configuration of a display device 10. The display device 10 is, for instance, an image processing device having at least one of print function, copy function, scan function, and facsimile function. However, the display device 10 is not limited to the image processing device, and may be, for instance, a personal computer, a smartphone, or a tablet terminal. The display device 10 includes a controller 11, a memory 12, a storage 13, a display 14, and an operational interface 15. These components are coupled to each other via a bus 16.

The controller 11 controls each component of the display device 10, and performs display control processing according to an exemplary embodiment of the disclosure. The controller 11 may include, for instance, a central processing unit (CPU). The memory 12 stores programs to cause the controller 11 to execute the display control processing according to the exemplary embodiment. The memory 12 may store, for instance, a read only memory (ROM) and a random access memory (RAM). The storage 13 may store various types of data used for the display control processing according to the exemplary embodiment. The various types of data include a list 20 in which multiple setting items are arranged in order, and an item table 131. The memory 12 may include, for instance, a hard disk drive or a solid state drive (SSD). The display 14 displays the list 20 stored in the memory 12. The display 14 may include, for instance, a liquid display. The operational interface 15 receives an operation performed on the list 20 displayed on the display 14, and supplies operational information indicating the operation to the controller 11. The operational interface 15 may include, for instance, a mouse and a touch panel. A touch screen may be configured by the display 14 and the operational interface 15.

FIG. 2 is a table illustrating an example of the item table 131. The item table 131 shows the relationship between the setting items included in the list 20 (the list 20 is shown in FIGS. 1 and 3) and the other setting items. The item table 131 includes an identifier of each of groups, an identifier of each of the setting items, an identifier of each of related items. The setting items are each an item indicating setting details of the display device 10. For instance, the setting items may indicate the setting details of the various functions of the display device 10. The related items are other setting items related to the setting items. The identifier of each group, the identifier of each setting item, and the identifier of each related item are pieces of information that uniquely identify the group, the setting item, and the related item, respectively. The identifiers of groups are arranged in a predetermined order. The identifiers of the setting items belonging to the same group are also arranged in a predetermined order.

The identifier of each group is associated with the identifiers of the setting items belonging to the group. For instance, a group "PDF security" is associated with the setting item "enabled". This indicates that the setting item "enabled" belongs to the group "PDF security". The identifier of each setting item is associated with the identifiers of related items of the setting item. For instance, the setting item "enabled" is associated with the related item "other setting items of the same group". This indicates that the related items of the setting item "enabled" are "other setting items of the same group", in other words, the setting items other than "enabled" which belongs to the group "PDF security".

FIG. 3 is a view illustrating an example of the list 20 displayed on the display 14. The x direction and the y direction in FIG. 3 indicate directions which are perpendicular to each other and parallel to the screen of the display 14. The contents in a display range 141 are displayed as a screen on the display 14. The list 20 is larger than the display range 141 of the display 14. Thus, only the portion included in the display range 141 which is part of the list 20 is displayed. In other words, the portion not included in the display range 141 is hidden. When a user performs an operation to scroll the list 20, the list 20 is scrolled and the hidden portion is displayed. To scroll is to display contents while moving the contents in the upper or lower direction or the right or left direction. In this example, multiple setting items included in the list 20 are arranged in the y direction according to the order of the arranged items of the item table 131. Each setting item includes an operation image which receives an operation. A user performs an operation on a setting item using the operation image. The header of each group includes the title of the group. For instance, the header of the group "PDF security" includes a title 201 in which "PDF security" is written. Also, the header of the group "Character Recognition (OCR)" includes a title 202 in which "Character Recognition (OCR)" is written. A user checks multiple setting items in the y direction, and performs an operation on a setting item as needed. As illustrated in FIG. 3, a fixed image 30 is displayed at the end of the display range 141 in the −y direction. The display position of the fixed image 30 is fixed, and the fixed image 30 is not moved even when a scroll operation is performed. Therefore, the list 20 is displayed on the portion of the display range 141, excluding the fixed image 30. It is to be noted that in the description below, the end of the display range 141 in the −y direction is referred to as the "upper end", and the end of the display range 141 in the y direction is referred to as the "lower end".

Figure 4:
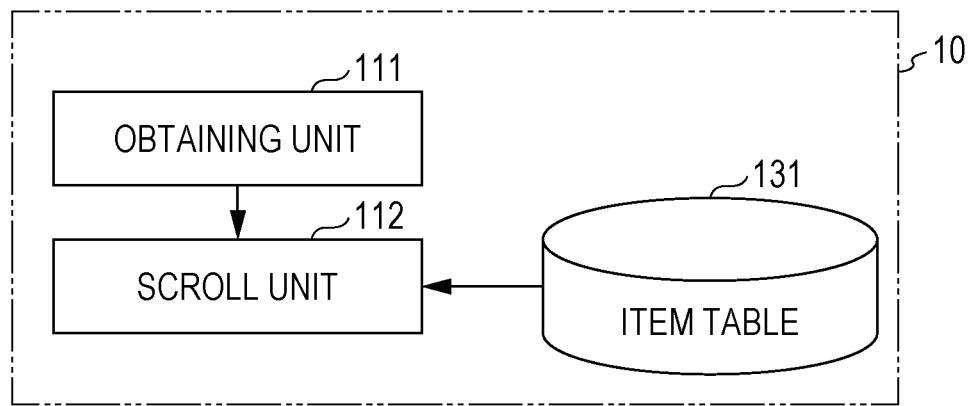
FIG. 4 is a diagram illustrating a functional configuration of the display device.

FIG. 4 is a diagram illustrating a functional configuration of the display device 10. The display device 10 functions as an obtaining unit 111 and a scroll unit 112. These functions are implemented by the controller 11 performing calculation through cooperative work between the programs stored in the memory 12 and the controller 11 that executes the programs.

When an operation is performed by a user on a setting item included in the list 20 displayed on the display 14, the obtaining unit 111 obtains operational information indicating the operation from the operational interface 15. The operation performed on a setting item includes at least one of an operation to change a setting item, an operation to select a setting item, and an operation to input a setting item. The operation to select a setting item may include, for instance, an operation to place a cursor on a setting item, and an operation to maintain a state where a cursor is placed on a setting item for a predetermined time or longer in addition to an operation to touch a setting item and an operation to place a mouse pointer on a setting item and click the setting item. The operational information obtained by the obtaining unit 111 is supplied to the scroll unit 112.

When the obtaining unit 111 obtains the operational information indicating the operation to a setting item, the scroll unit 112 scrolls the list 20 to preferentially display related items related to an operated setting item (hereinafter referred to as a "target item"). The related items are identified by referring to the item table 131 stored in the memory 12. Scrolling of the list 20 is implemented by supplying a control signal to the display 14, the control signal indicating a scroll direction and a scroll amount, for instance.

The related items include first related item(s) which are other setting items belonging to the same group as that of the target item, and second related item(s) which are other predetermined setting items to be operated in association with the target item. The second related items may include, for instance, other setting items which need to be changed when the target item is changed, and other setting items to be changed in relation to the target item. In the example illustrated in FIG. 2, the related items of the setting item "enabled" belonging to the group "PDF security" are the related items belonging to the same group as that of the setting item, thus are the first related items. In contrast, the related items of the setting item "authorization, password" belonging to the group "PDF security" are other predetermined setting items "authorization, printing is permitted", "authorization, change is permitted", "authorization, copying is permitted", and "authorization, access is permitted" to be operated in association with the setting item, thus are the second related items.

The above-mentioned "preferentially displayed" indicates that the related items are displayed so as to be easily searched for. For instance, "preferentially displayed" may include that the related items are displayed at a position which allows a user to search for the related items easily.

The position which allows a user to search for the related items easily may include, for instance, the upper end or the lower end of the display range 141. However, the position which allows a user to search for the related items easily is not limited to the upper end or the lower end of the display range 141, and may include the center and the corners of the display range 141.

As a method of scrolling the list 20 to preferentially display the related items, for instance, a method of scrolling the list 20 to a position where the related items are displayed at the upper end or the lower end of the display range 141 of the display 14 may be used. However, when the fixed image 30 is displayed at the upper end of the display range 141 as illustrated in FIG. 3, the upper end of the display range 141 excluding the fixed image 30, in other words, the position adjacent to the fixed image 30 in the y direction may be used as the upper end of the display range 141. In this example, the "upper end" and the "lower end" of the display range 141 are used as the "one end" and the "other end", respectively, of the image according to the exemplary embodiment of the disclosure.

When multiple related items are present in the above-described method, the list 20 may be scrolled to display one related item (hereinafter referred to as a "target related item"), which is one of the related items and satisfies a predetermined condition, at the one end or the other end of the screen. The predetermined condition may be a condition that specifies a related item in which a user who has performed an operation on the target item is interested the most except for the target item. The target related item may be a related item subsequent to the target item in the order. When multiple related items are present subsequent to the target item in the order, the target related item may be one of the related items at a predetermined place. The predetermined place may be the first place or the last place, for instance. In the above-described method, when multiple related items are present and the related items fall within the display range 141, the list 20 may be scrolled to a position where those related items are all displayed. Whether or not the multiple related items fall within the display range 141 may be determined, for instance, by comparing the size of the display range 141 with the size of the display area occupied by the multiple related items.

As another method of scrolling the list 20 to preferentially display the related items, the following method of scrolling the list 20 may be used. In the method, when the related items are each the first related item, and the group (hereinafter referred to as the "target group") to which the target item belongs and another group are displayed side by side on the screen, the display area of the target group occupied on the screen is increased, in other words, the display area of another group occupied on the screen is decreased.

As still another method of scrolling the list 20 to preferentially display the related items, a method of scrolling the list 20 to display the target item and the related items may be used. In the method, when the related items are arranged subsequent to the target item in the list 20, the list 20 may be scrolled to display the target item at the upper end of the display range 141.

2. Operation 2.1 First Operation Example

Figure 5:
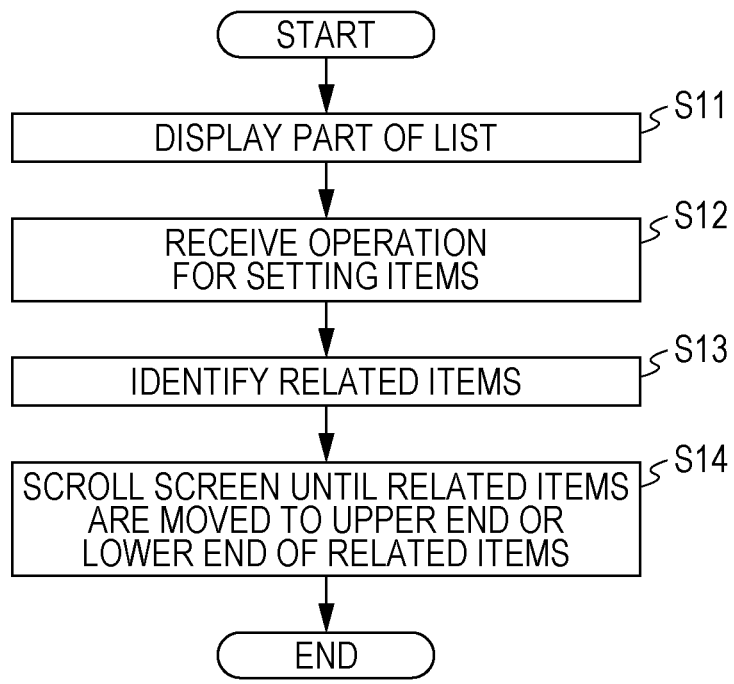
FIG. 5 is a flowchart illustrating a first operation example of the display device.

FIG. 5 is a flowchart illustrating a first operation example of the display device 10. In step S11, part of the list 20 is displayed on the display 14. In step S12, an operation to one setting item included in the list 20 is received by the operational interface 15. Accordingly, operational information indicating the operation is supplied to the obtaining unit 111. In step S13, the item table 131 stored in the memory 12 is referred to, and the related items of an operated target item are identified. In step S14, the list 20 is scrolled by the scroll unit 112 until the related items are moved to the upper end or the lower end of the display range 141.

Figure 6A:
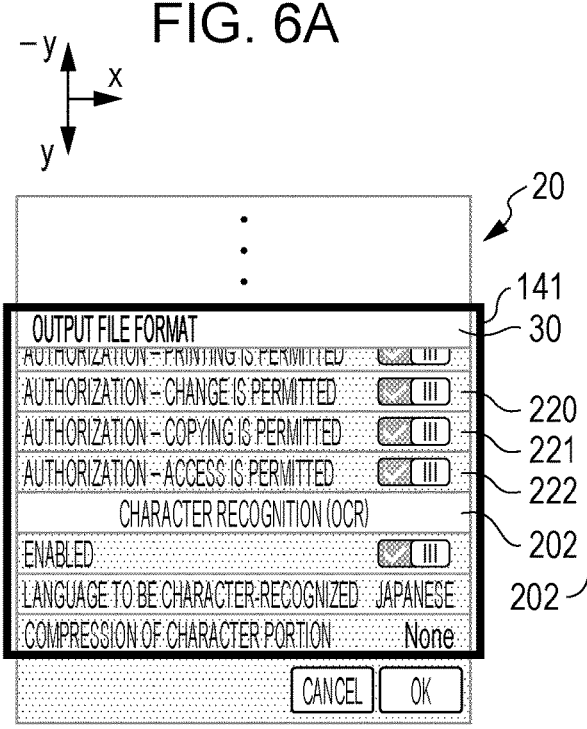
FIGS. 6A to 6D are views illustrating an example of screen transition of a list according to the first operation example.
Figure 6B:
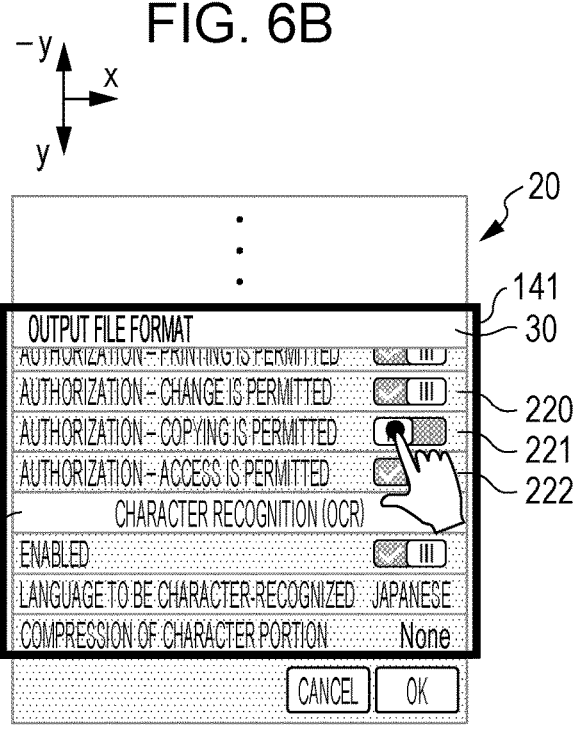
Figure 6C:
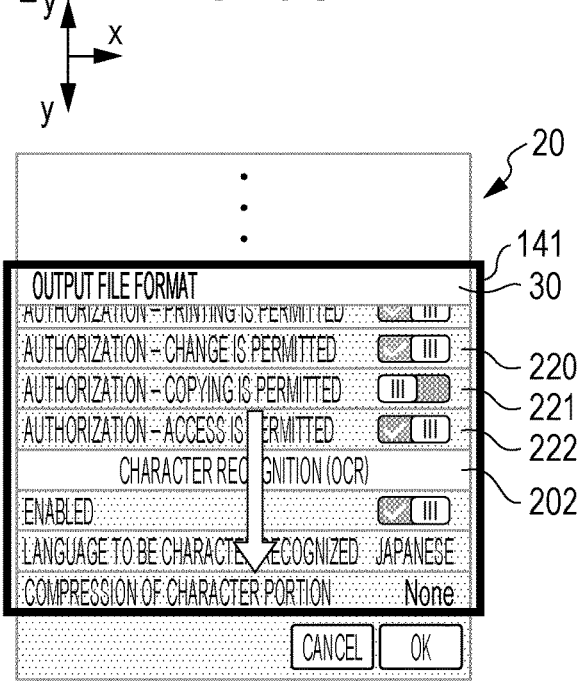
Figure 6D:
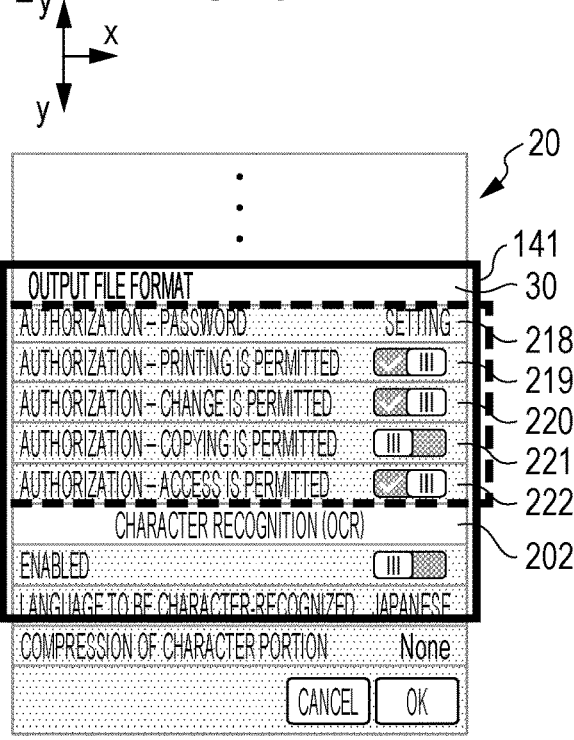

FIGS. 6A to 6D are views illustrating an example of screen transition of the list 20 according to the first operation example. As illustrated in FIG. 6A, the portion included in the display range 141 of the list 20 is displayed on the display 14 (step S11). As illustrated in FIG. 6B, when a user performs an operation to change a setting item 221 called "authorization, copying is permitted" (step S12), the item table 131 illustrated in FIG. 2 is referred to, and the related items of the setting item 221 called "authorization, copying is permitted", specifically, a setting item 218 called "authorization, password", a setting item 219 called "authorization, printing is permitted", a setting item 220 called "authorization, change is permitted", and a setting item 222 called "authorization, access is permitted" are identified (step S13). These related items are each the second related item. In this case, as illustrated in FIGS. 6C and 6D, the list 20 is scrolled in the y direction until the setting item 218 called "authorization, password" which is the first one of the related items is moved to the upper end of the display range 141 excluding the fixed image 30 (step S14). Thus, the setting item 218 called "authorization, password" is displayed at the upper end of the display range 141. In this example, the setting item 221 as the target item is located between the setting item 220 and the setting item 222 which are related items. When the setting item 218 is displayed at the upper end of the display range 141, the setting items 218 to 222 fall within the display range 141. Thus, the setting item 221 which is the target item, and the setting items 218, 219, 220, and 222 which are the related items are displayed together.

FIGS. 7A to 7D are views illustrating an example of screen transition of the list 20 according to the first operation example. As illustrated in FIG. 7A, the portion included in the display range 141 of the list 20 is displayed on the display 14 (step S11). As illustrated in FIG. 7A, when a user performs an operation to change the setting item 218 called "authorization, password" (step S12), the item table 131 illustrated in FIG. 2 is referred to, and the related items of the setting item 218 called "authorization, password", specifically, the setting item 219 called "authorization, printing is permitted", the setting item 220 called "authorization, change is permitted", the setting item 221 called "authorization, copying is permitted", and the setting item 222 called "authorization, access is permitted" are identified (step S13). These related items are each the second related item, and all fall within the display range 141. In this case, as illustrated in FIGS. 7C and 7D, the list 20 is scrolled in the −y direction until the setting item 222 called "authorization, access is permitted" which is the last one of the related items is moved to the lower end of the display range 141 (step S14). Thus, the setting item 222 called "authorization, access is permitted" is displayed at the lower end of the display range 141. In this example, the setting items 219, 220, 221, and 222 are arranged subsequent to the setting item 218. When the setting item 222 is displayed at the lower end of the display range 141, the setting items 218 to 222 fall within the display range 141. Thus, the setting item 218 which is the target item, and the setting items 219, 220, 221, and 222 which are the related items are displayed together.

Figure 8A:
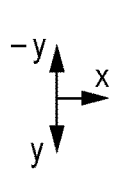
FIGS. 8A and 8B are views illustrating another example of screen transition of the list according to the first operation example.
Figure 8B:
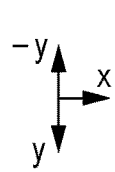

FIGS. 8A and 8B are views illustrating another example of screen transition of the list 20 according to the first operation example. As illustrated in FIG. 8A, the portion included in the display range 141 of the list 20 is displayed on the display 14 (step S11). As illustrated in FIG. 8A, when a user performs an operation to change a setting item 214 called "mail transmission" (step S12), the item table 131 illustrated in FIG. 2 is referred to, and the related item "other setting items of the same group" of the setting item 214 called "mail transmission" is identified (step S13). These related items are each the first related item. In this case, as illustrated in FIG. 8B, the list 20 is scrolled in the −y direction until a setting item 215 called "FTP transmission", which is the first one of the related items subsequent to the setting item 214 called "mail transmission" in the order, is moved to the lower end of the display range 141 (step S14). Thus, the setting item 215 called "FTP transmission" is displayed at the lower end of the display range 141. In this example, the setting item 215 is arranged subsequent to the setting item 214. Thus, when the setting item 215 is displayed at the lower end of the display range 141, the setting item 214 which is the target item, and the setting item 215 which is one of the related items are displayed together.

Figures 9A, 9B:
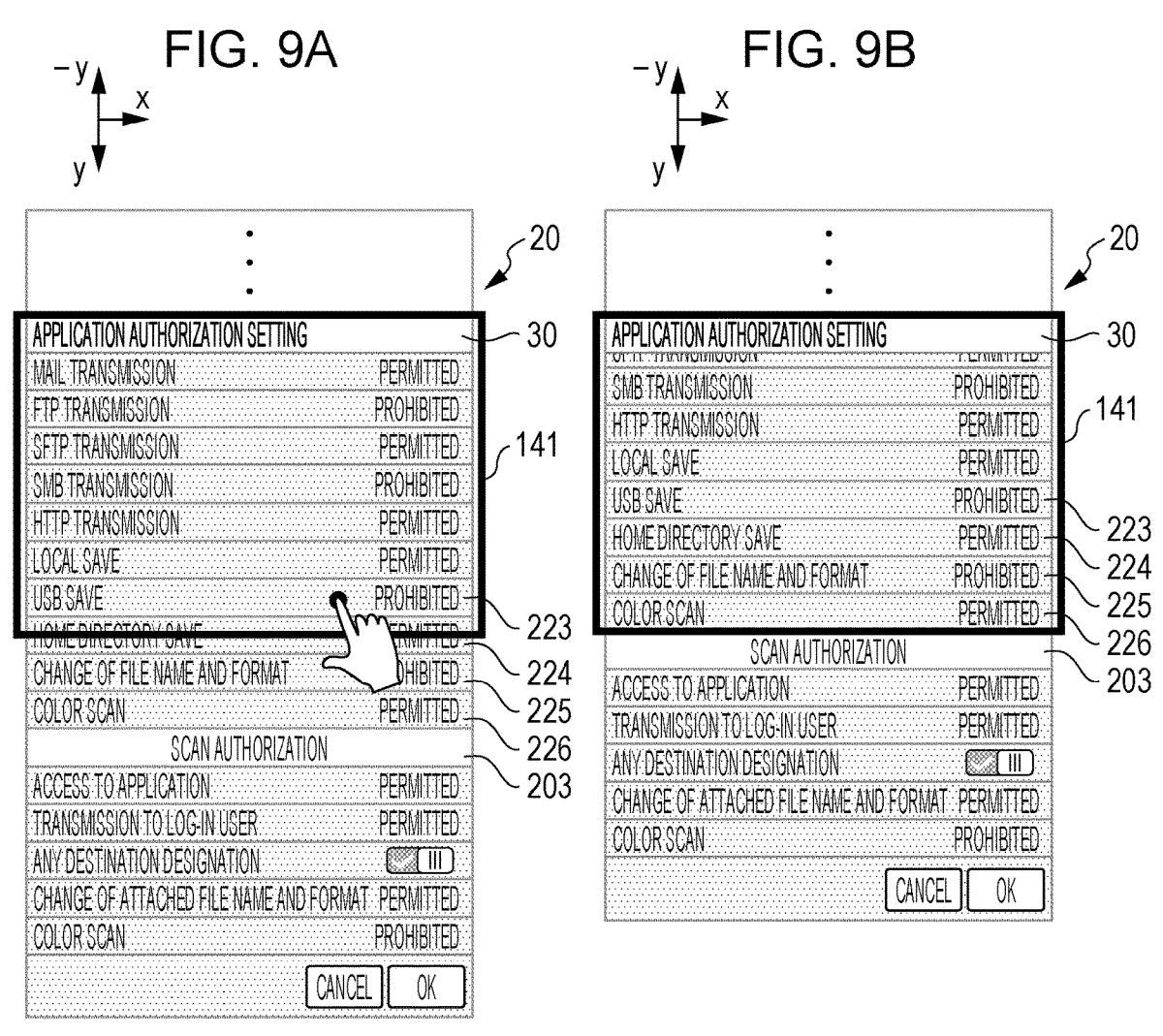

FIGS. 9A and 9B are views illustrating another example of screen transition of the list 20 according to the first operation example. As illustrated in FIG. 9A, the portion included in the display range 141 of the list 20 is displayed on the display 14 (step S11). As illustrated in FIG. 9A, when a user performs an operation to change a setting item 223 called "USB saving" (step S12), the item table 131 illustrated in FIG. 2 is referred to, and the related item "other setting items of the same group" of the setting item 223 called "USB saving" is identified (step S13). These related items are each the first related item. In this example, the setting item 223 called "USB saving", and its related items subsequent to the setting item 223 in the order, specifically, a setting item 224 called "home directory saving", a setting item 225 called "change of file name and format", and a setting item 226 called "color scan" all fall within the display range 141. In this case, as illustrated in FIG. 9B, the list 20 is scrolled in the −y direction until the setting item 226 called "color scan", which is the last one of the related items, is moved to the lower end of the display range 141 (step S14). Thus, the setting item 226 called "color scan" is displayed at the lower end of the display range 141. In this example, the setting items 224 to 226 are arranged subsequent to the setting item 223. These setting items 223 to 226 fall within the display range 141. Thus, the setting item 223 which is the target item, and the setting items 224 to 226 which are the related items subsequent to the setting item 223 in the order are displayed together.

2.2 Second Operation Example

Figure 10:
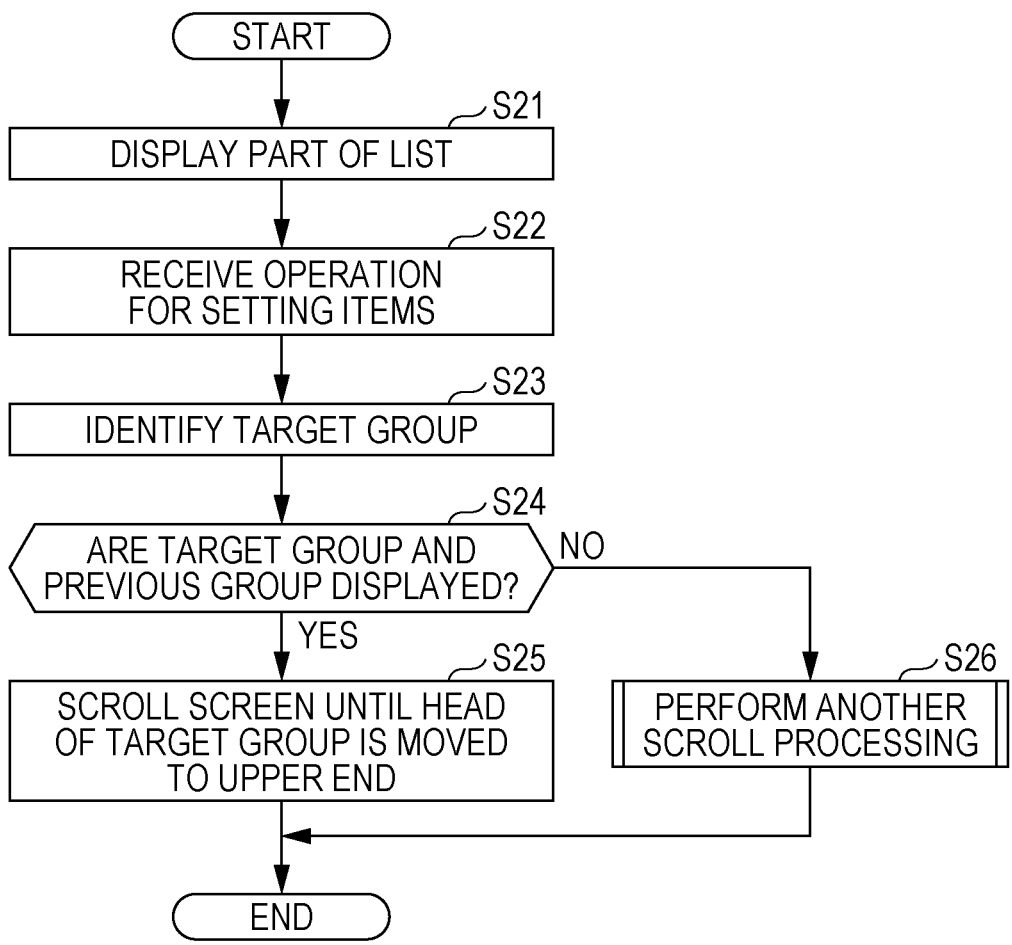
FIG. 10 is a flowchart illustrating a second operation example of the display device.

FIG. 10 is a flowchart illustrating a second operation example of the display device 10. The second operation example is performed when the related item is the first related item, for instance. In step S21, part of the list 20 is displayed on the display 14. In step S22, an operation to one setting item included in the list 20 is received by the operational interface 15. Accordingly, operational information indicating the operation is supplied to the obtaining unit 111. In step S23, the item table 131 stored in the memory 12 is referred to, and the target group to which an operated target item belongs is identified. In step S24, it is determined whether the target group and the group immediately previous to the target group are displayed on one screen. When the target group and the previous group are displayed on one screen, the determination in step S24 is YES, and the processing proceeds to step S25. In step S25, the list 20 is scrolled by the scroll unit 112 until the header of the target group is moved to the upper end of the display range 141. On the other hand, when the target group and the previous group are not displayed on one screen in step S24 described above, the determination in step S24 is NO, and the processing proceeds to step S26. In step S26, another scroll processing different from that in step S25 described above is performed.

Figure 11C:
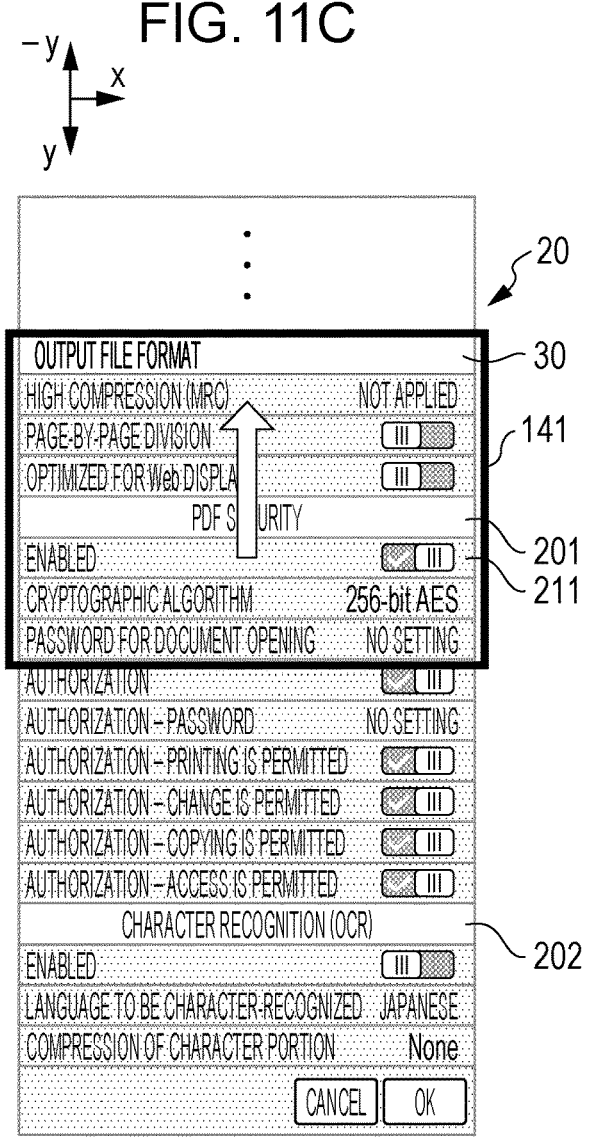
Figure 11D:
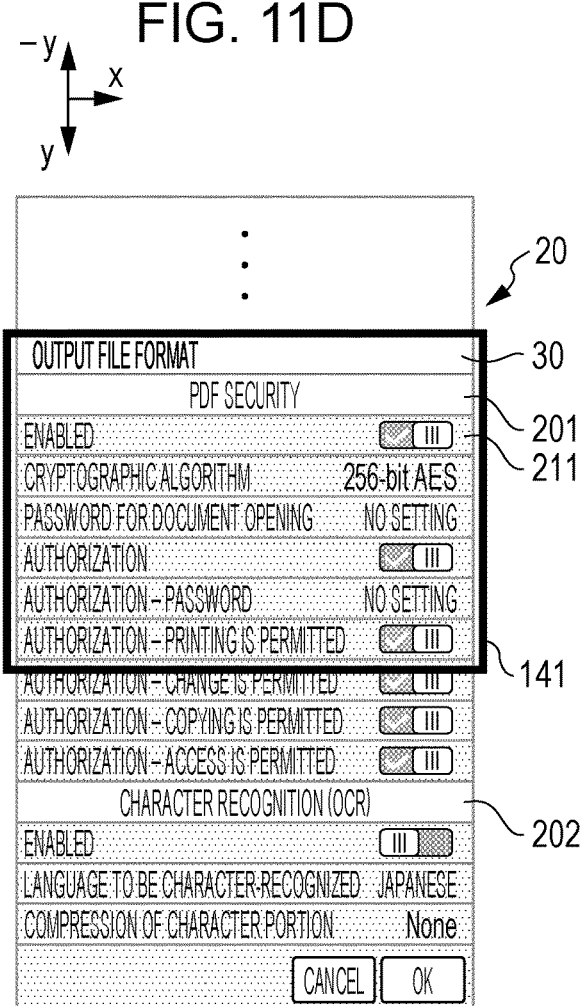

FIGS. 11A to 11D are views illustrating an example of screen transition of the list 20 according to the second operation example. As illustrated in FIG. 11A, the portion included in the display range 141 of the list 20 is displayed on the display 14 (step S21). As illustrated in FIG. 11B, when a user performs an operation to change a setting item 211 called "enabled" (step S22), the item table 131 illustrated in FIG. 2 is referred to, and the group "PDF security", to which the setting item 211 called "enabled" belongs, is identified as the target group (step S23). As illustrated in FIG. 11B, the display range 141 contains both a setting item belonging to the group "PDF security" and setting items belonging to the previous group "common", thus it is determined that these groups are displayed on one screen (the determination in step S24 is YES). All the setting items belonging to the group "PDF security" do not fall within the display range 141. In this case, as illustrated in FIG. 11C, the list 20 is scrolled in the −y direction until the title 201 at the head of the group "PDF security" is moved to the upper end of the display range 141 excluding the fixed image 30 (step S25). Thus, as illustrated in FIG. 11D, the title 201 of the group "PDF security" is displayed at the upper end of the display range 141. As a consequence, the display area of the group "PDF security" occupied on the screen is increased. In contrast, the group "common" is hidden, and its display area is eliminated.

Figure 12A:
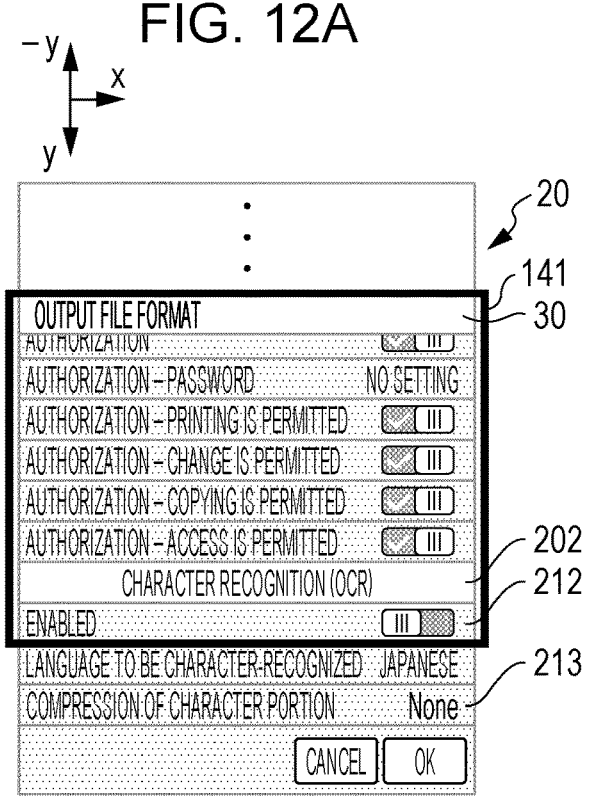
FIGS. 12A to 12D are views illustrating another example of screen transition of the list according to the second operation example.
Figure 12B:
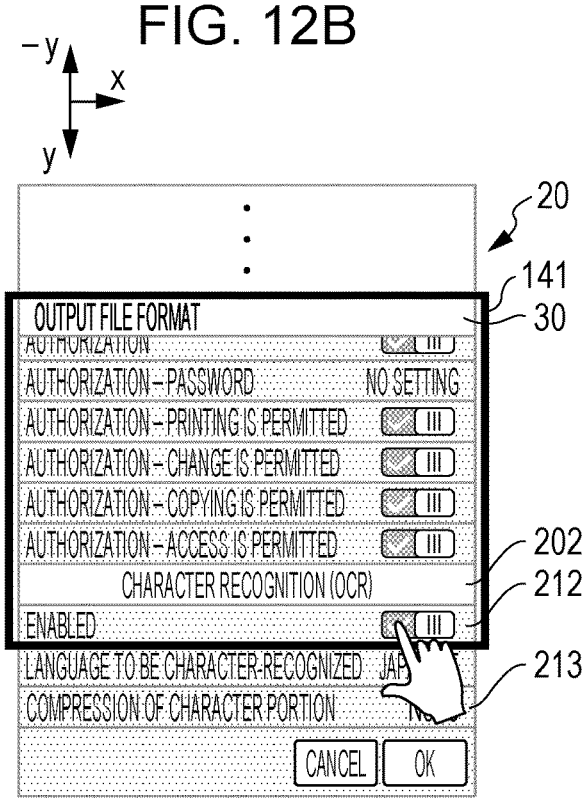
Figure 12C:
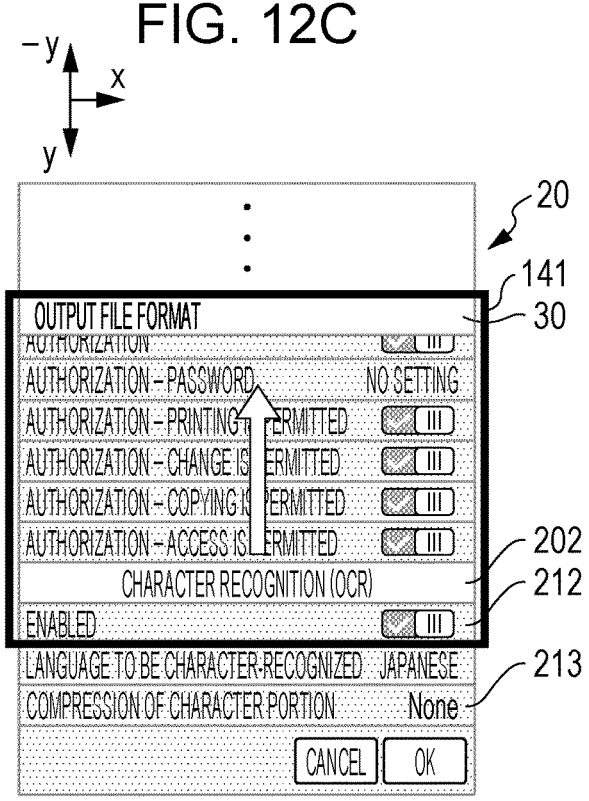
Figure 12D:
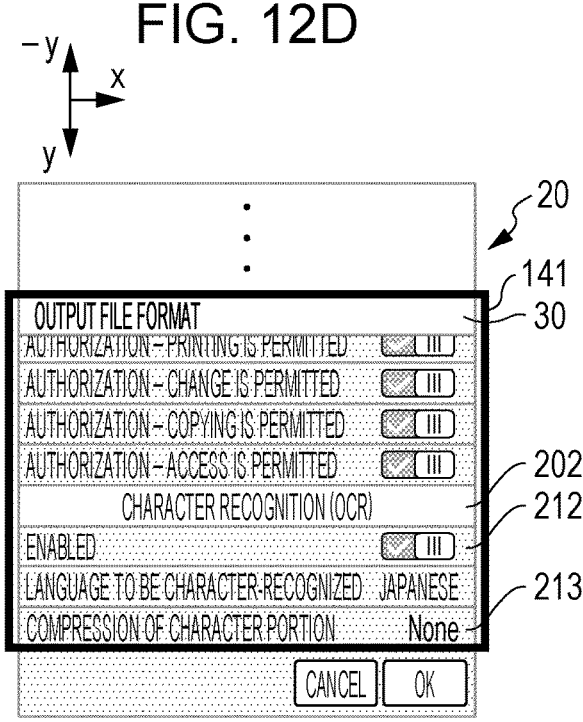

FIGS. 12A to 12D are views illustrating another example of screen transition of the list 20 according to the second operation example. As illustrated in FIG. 12A, the portion included in the display range 141 of the list 20 is displayed on the display 14 (step S21). As illustrated in FIG. 12B, when a user performs an operation to change a setting item 212 called "enabled" (step S22), the item table 131 illustrated in FIG. 2 is referred to, and a group "optical character recognition (OCR)", to which the setting item 212 called "enabled" belongs, is identified as the target group (step S23). As illustrated in FIG. 12B, the display range 141 contains both a setting item belonging to the group "optical character recognition (OCR)" and setting items belonging to the previous group "PDF security", thus it is determined that these groups are displayed on one screen (the determination in step S24 is YES). All the setting items belonging to the group "optical character recognition (OCR)" fall within the display range 141. In this case, as illustrated in FIG. 12C, the list 20 is scrolled in the −y direction until the last setting item 213 called "compression of character portion" belonging to the group "optical character recognition (OCR)" is moved to the lower end of the display range 141 (step S25). Thus, as illustrated in FIG. 12D, all the setting items belonging to the group "optical character recognition (OCR)" are displayed. As a consequence, the display area of the group "optical character recognition (OCR)" occupied on the screen is increased. In contrast, the display area of the group "PDF security" occupied on the screen is decreased.

Figure 13A:
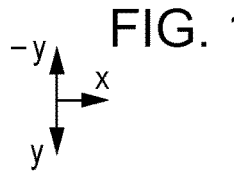
FIGS. 13A and 13B are views illustrating another example of screen transition of the list according to the second operation example.
Figure 13B:
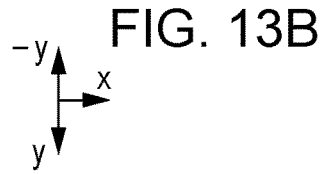

FIGS. 13A and 13B are views illustrating another example of screen transition of the list 20 according to the second operation example. As illustrated in FIG. 13A, the portion included in the display range 141 of the list 20 is displayed on the display 14 (step S21). As illustrated in FIG. 13A, when a user performs an operation to change the setting item 214 called "mail transmission" (step S22), the item table 131 illustrated in FIG. 2 is referred to, and a group "scan authorization", to which the setting item 214 called "mail transmission" belongs, is identified as the target group (step S23). As illustrated in FIG. 13A, the display range 141 contains both setting items belonging to the group "scan authorization" and the setting items belonging to the previous group "copy authorization", thus it is determined that these groups are displayed on one screen (the determination in step S24 is YES). All the setting items belonging to the group "scan authorization" do not fall within the display range 141. In this case, as illustrated in FIG. 13B, the list 20 is scrolled in the −y direction until a title 203 at the head of the group "scan authorization" is moved to the upper end of the display range 141 excluding the fixed image 30 (step S25). Thus, the title 203 of the group "scan authorization" is displayed at the upper end of the display range 141 excluding the fixed image 30. As a consequence, the display area of the group "scan authorization" occupied on the screen is increased. In contrast, the group "copy authorization" is hidden, and its display area is eliminated.

2.3 Third Operation Example

Figure 14:
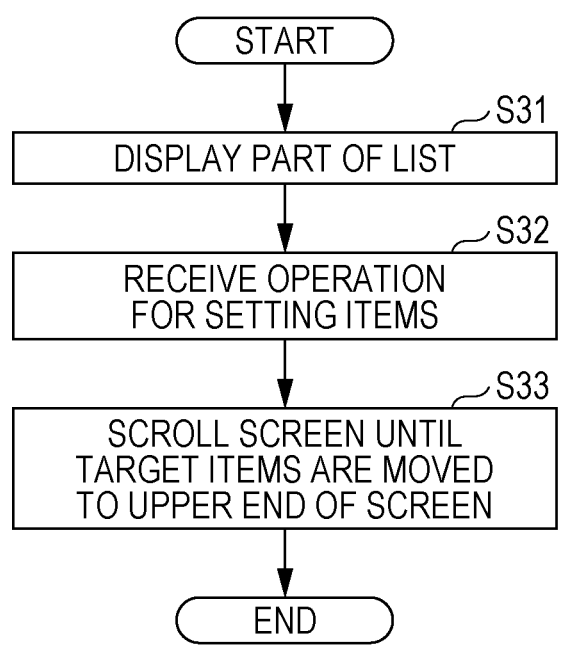
FIG. 14 is a flowchart illustrating a third operation example of the display device.

FIG. 14 is a flowchart illustrating a third operation example of the display device 10. In step S31, part of the list 20 is displayed on the display 14. In step S32, an operation to one setting item included in the list 20 is received by the operational interface 15. Accordingly, operational information indicating the operation is supplied to the obtaining unit 111. In step S33, the list 20 is scrolled by the scroll unit 112 until an operated target item is moved to the upper end of the display range 141.

Figures 15C, 15D:
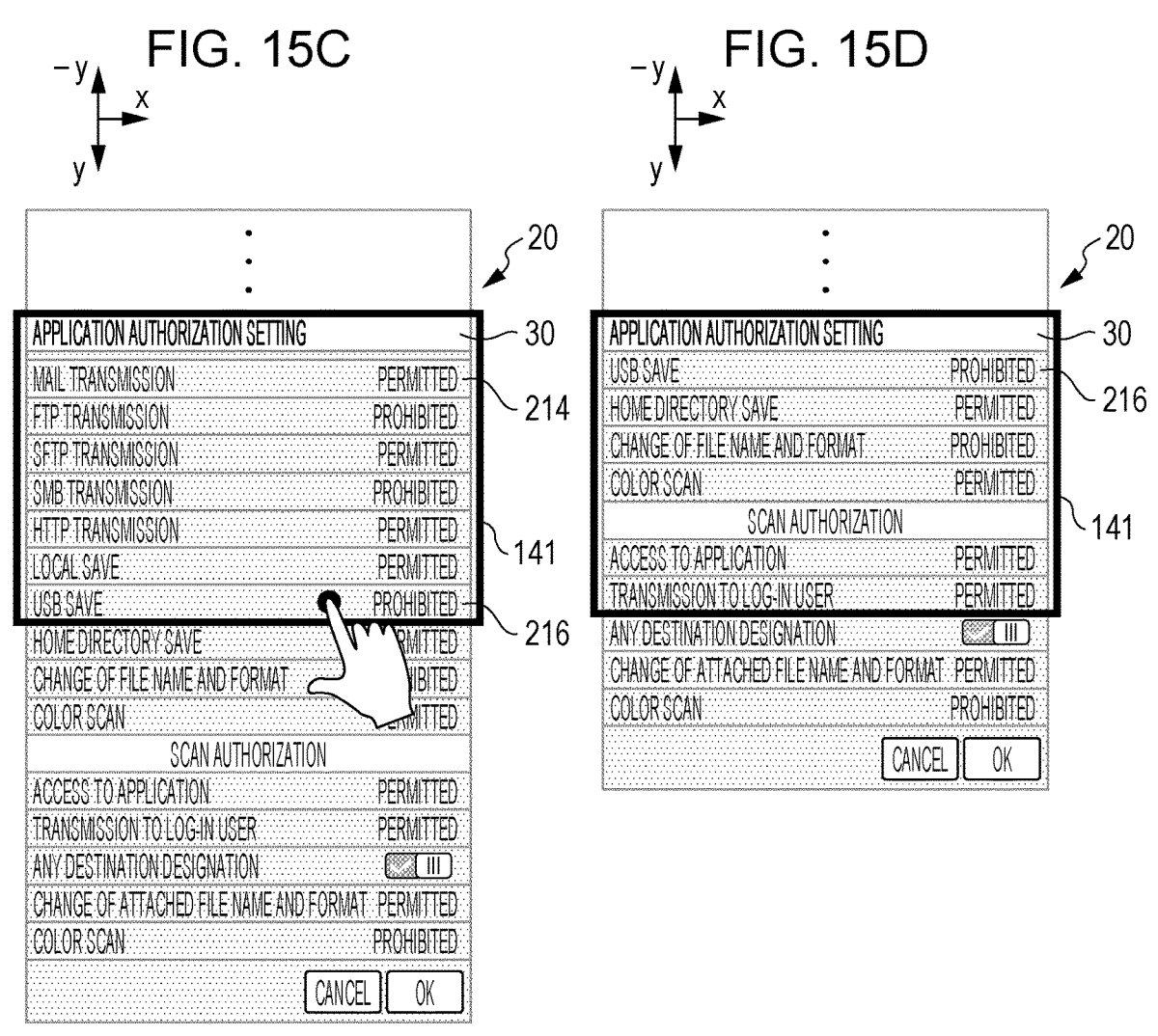

FIGS. 15A to 15D are views illustrating an example of screen transition according to the third operation example. As illustrated in FIG. 15A, the portion included in the display range 141 of the list 20 is displayed on the display (step S31). As illustrated in FIG. 15A, when a user performs an operation to change the setting item 214 called "mail transmission" (step S32), as illustrated in FIG. 15B, the list 20 is scrolled in the −y direction until the setting item 214 called "mail transmission" is moved to the upper end of the display range 141 excluding the fixed image (step S33). Thus, the setting item 214 called "mail transmission" is displayed at the upper end of the display range 141 excluding the fixed image 30. In this example, subsequent to the setting item 214 called "mail transmission", the related items placed after the setting item 214 in the order are arranged. Thus, when the setting item 214 which is the target item is displayed at the upper end of the display range 141 excluding the fixed image 30, the setting item 214 and the related items subsequent to the setting item 214 in the order are displayed together.

Subsequently, as illustrated in FIG. 15C, when a user performs an operation to change a setting item 216 called "USB saving" (step S32), as illustrated in FIG. 15D, the list 20 is scrolled in the −y direction until the setting item 216 called "USB saving" is moved to the upper end of the display range 141 excluding the fixed image 30 (step S33). Thus, the setting item 216 called "USB saving" is displayed at the upper end of the display range 141 excluding the fixed image 30. In this example, subsequent to the setting item 216, the related items placed after the setting item 216 in the order are arranged. Thus, when the setting item 216 which is the target item is displayed at the upper end of the display range 141 excluding the fixed image 30, the setting item 216 and the related items subsequent to the setting item 216 in the order are displayed together.

The first to third operation examples described above may be performed independently or performed in combination. For instance, another scroll processing in the second operation example may be the first operation example or the third operation example. In this case, processing overlapping with the second operation example may not be performed. For instance, when the determination in step S24 is NO, scrolling may not be performed. Alternatively, at least two of the first to third operation examples may be performed successively. For instance, screen transition of the list 20 may be made in the order illustrated in FIGS. 11A to 11D, FIGS. 7A to 7D, FIGS. 12A to 12D, and FIGS. 6A to 6D. Alternatively, screen transition of the list 20 may be made in the order illustrated in FIGS. 13A and 13B, FIGS. 15A to 15D, the order illustrated in FIGS. 13A and 13B, FIGS. 8A and 8B, or the order illustrated in FIGS. 13A and 13B, FIGS. 9A and 9B. It is to be noted that an operation to scroll the list 20 may be performed by a user during these screen transitions. Alternatively, the first to third operation examples described above may be switched and performed. For instance, when a related item is the first related item, the second operation example may be performed, and when a related item is the second related item, the first operation example or the third operation example may be performed. Furthermore, in the first to third operation examples described above, the first related items and the second related items may be switched with each other as long as no contradiction occurs.

According to the exemplary embodiment described above, when an operation is performed on a target item, scrolling is performed without an operation of a user to preferentially display related items, thus it is easy to search for the related items. As a consequence, checking the related items is made easy, and a failure in checking the related items and a mistake in setting a related item can be prevented. In addition, after performing an operation on a target item, a user can perform an operation on any related item without performing an operation to scroll the list 20 to a position where related items are displayed. Furthermore, when a related item is the first related item, it is easier to search for other setting items belonging to the same group as that of the target item, as compared with when the related item is different from the first related item. When a related item is the second related item, it is easier to search for other predetermined setting items to be operated in association with the target item, as compared with when the related item is different from the second related item.

In addition, in the examples illustrated in FIGS. 6A to 6D and FIGS. 7A to 7D, when an operation is performed on a target item, the list 20 is scrolled to a position where the related items are displayed at the upper end or the lower end of the screen, and thus it is easier to search for the related items, as compared with when the list 20 is scrolled to a position where other setting items are displayed at the upper end or the lower end of the screen. Furthermore, in the examples illustrated in FIGS. 6A to 6D and FIGS. 7A to 7D, when an operation is performed on a target item, the list 20 is scrolled to a position where all the multiple related items are displayed, and thus it is easier to search for the multiple related items, as compared with when the list 20 is scrolled to a position where at least part of these setting items is not displayed.

In addition, in the example illustrated in FIGS. 8A and 8B, when an operation is performed on a target item, the list 20 is scrolled to a position where the first related item of at least one of the related items subsequent to the target item in the order is displayed at the lower end of the screen, and thus it is easier to search for the related items, as compared with when the list 20 is scrolled to a position where other related items are displayed at the lower end or the upper end of the screen. Furthermore, in the example illustrated in FIGS. 9A and 9B, when an operation is performed on a target item, the list 20 is scrolled to display both the target item and the related items, thus a user can perform an operation on the target item while viewing the related items.

In addition, in the examples illustrated in FIGS. 11A-11D to 13A-13D, when an operation is performed on a target item, the list 20 is scrolled to increase the display area of the group to which the target item belongs, and thus it is easier to search for other setting items belonging to the same group as that of the target item, as compared with when the list 20 is scrolled to decrease the display area of the group to which the target item belongs. In other words, in the examples illustrated in FIGS. 11A-11D to 13A-13D, the list 20 is scrolled to decrease the display area of another group displayed along with the group to which the target item belongs, and thus it is easier to search for other setting items belonging to the same group as that of the target item, as compared with when the list 20 is scrolled to increase the display area of another group.

3. Modification

Each exemplary embodiment described above is an example of the disclosure. The disclosure is not limited to the exemplary embodiment described above. Alternatively, the exemplary embodiment described above may be modified and carried out as in the following example. In this situation, two or more of the following modifications may be used in combination.

In the exemplary embodiment described above, the scroll unit 112 may scroll the list 20 to a position where the first related item is displayed at the upper end of the screen. For instance, in the example illustrated in FIGS. 8A and 8B, when a user performs an operation to change the setting item 214 called "mail transmission", the list 20 may be scrolled until the setting item 215 called "FTP transmission", which is the first one of the related items subsequent to the setting item 214 in the order, is moved to the upper end of the display range 141 excluding the fixed image 30. Alternatively, in this case, the list 20 may be scrolled until the setting item called "access to application", which is the first one of the related items of the setting item 214, is moved to the upper end of the display range 141 excluding the fixed image 30.

In the exemplary embodiment described above, when multiple related items fall within the screen, the scroll unit 112 may scroll the list 20 to any position where the multiple related items are displayed. For instance, in the example illustrated in FIGS. 6A to 6D, the list 20 may be scrolled to display the setting items 218 to 222 at the center of the display range 141.

In the exemplary embodiment described above, scrolling by the scroll unit 112 may be performed only when the direction of scrolling is set to a predetermined direction in order to preferentially display the related items. In other words, scrolling by the scroll unit 112 may not be performed when the direction of scrolling is set different from a predetermined direction in order to preferentially display the related items. The predetermined direction is, for instance, the direction opposite to the direction in which the multiple related items are arranged in the list 20, specifically, the −y direction. This is because in order for a user to check the multiple related items contained in the list 20 in the y direction which is the forward direction, the list 20 needs to be scrolled in the −y direction. In this case, as illustrated in FIGS. 7A to 7D, when the related items are present in the y direction as viewed from an operated setting item, the direction of scrolling is set to the −y direction in order to preferentially display the related items, thus scrolling by the scroll unit 112 is performed. On the other hand, for instance when the related items are present in the −y direction as viewed from an operated setting item, the direction of scrolling is set to the y direction in order to preferentially display the related items, thus scrolling by the scroll unit 112 is not performed. This is because it is considered that a user has already checked the related items present in the −y direction as viewed from an operated setting item, thus the related items may not be preferentially displayed.

However, for instance, when a user performs an operation to scroll the list 20 in the y direction in the list 20, the direction of scroll operation may be used as a predetermined direction. This is because when a user performs an operation to scroll the list 20 in the y direction, it is considered that the user checks the multiple setting items in the −y direction which is opposite to the direction in which the setting items are arranged in the list 20. For instance, in the example illustrated in FIGS. 7A to 7D, it is assumed that a user performs an operation to scroll the list 20 in the y direction. In this case, when the related items are present in the −y direction as viewed from an operated setting item, the direction of scrolling is set to the y direction in order to preferentially display the related items, thus scrolling by the scroll unit 112 is performed. On the other hand, for instance, when the related items are present in the y direction as viewed from an operated setting item, the direction of scrolling is set to the −y direction in order to preferentially display the related items, thus scrolling by the scroll unit 112 is not performed. This is because for instance when a user performs an operation to scroll the list 20 in the y direction, it is probable that a user searches for the related items present in the −y direction as viewed from an operated setting item, thus the related items may be preferentially displayed.

In the exemplary embodiment described above, when one group and another group are displayed side by side on one screen as a result of scrolling the list 20 according to an operation of a user, the list 20 may be scrolled to preferentially display one of the groups. In this case, when an operation to scroll the list 20 displayed on the display 14 is performed, the obtaining unit 111 obtains operational information indicating the operation from the operational interface 15. After the list 20 is scrolled according to an operation indicated by the operational information obtained by the obtaining unit 111, when one group and another group are displayed side by side on the screen of the display 14, the list 20 is further scrolled to increase the display area, occupied on the screen, of one of the one group and another group, the one satisfying a predetermined condition. The predetermined condition is a condition that indicates presence of interest of a user. For instance, the predetermined condition indicates that the display range is large. Specifically, the exemplary embodiment of the disclosure may provide a display control device including an obtaining unit that, when part of a list in which multiple items belonging to multiple groups are arranged in order is displayed on a display, and an operation to scroll the list is performed, obtains operational information indicating the operation; and a scroll unit that, when the list is scrolled in response to the operation indicated by the operational information, then one group and another group are displayed side by side on the screen of the display, further scrolls the list to increase the display area, occupied on the screen, of one of the one group and another group, the one satisfying the predetermined condition.

Figure 16A:
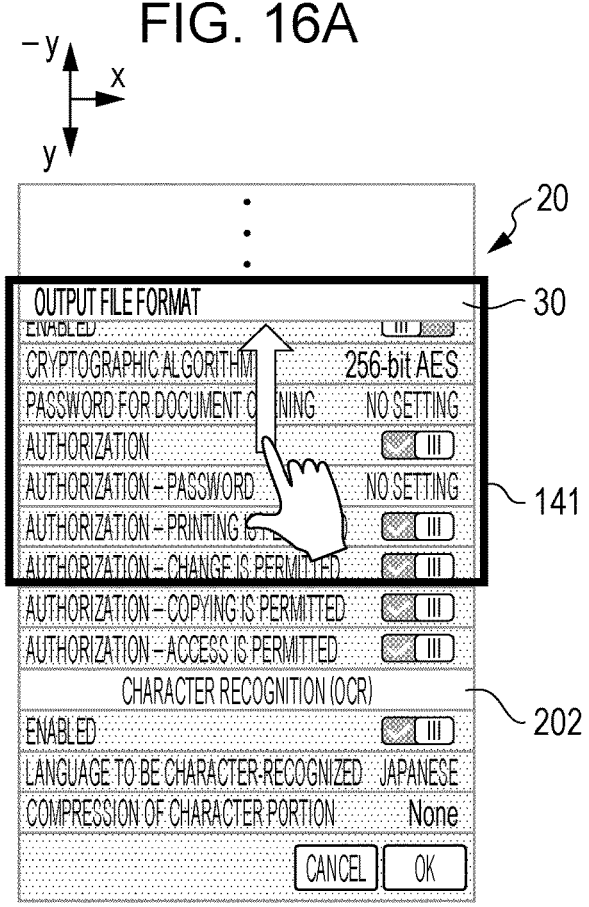
FIGS. 16A to 16C are views illustrating an example of screen transition of a list according to a modification.
Figure 16B:
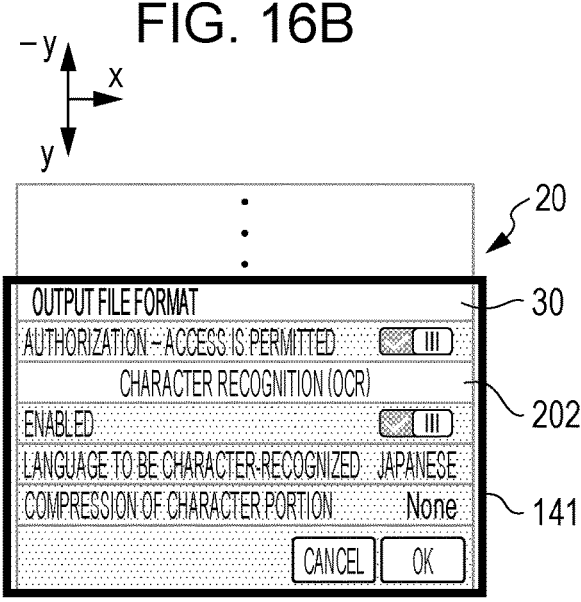
Figure 16C:
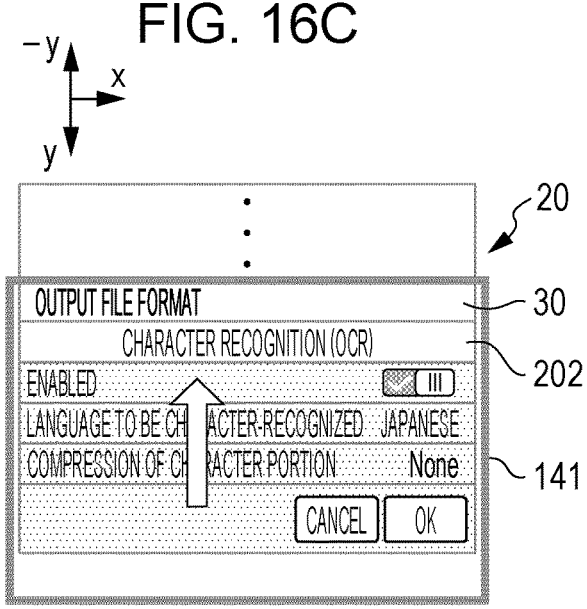

FIGS. 16A to 16C are views illustrating an example of screen transition of the list 20 according to a modification. As illustrated in FIG. 16A, the portion included in the display range 141 of the list 20 is displayed on the display 14. As illustrated in FIG. 16B, when a user performs an operation to scroll the list 20 in the −y direction, the list 20 is scrolled in the −y direction in response to the operation. The display range 141 contains both setting items belonging to the group "optical character recognition (OCR)" and the setting items belonging to the previous group "PDF security". In this example, the size of the display area for the information on the group "optical character recognition (OCR)" is less than the size of the display area for the information on the group "PDF security". In this case, as illustrated in FIG. 16C, the list 20 is scrolled in the −y direction until the title 202 at the head of the group "optical character recognition (OCR)" is moved to the upper end of the display range 141 excluding the fixed image 30. Thus, the title 202 of the group "optical character recognition (OCR)" is displayed at the upper end of the display range 141 excluding the fixed image 30. As a consequence, the display area of the group "optical character recognition (OCR)" occupied on the screen is increased. In contrast, the group "PDF security" is hidden, and its display area is eliminated. This is because when the state illustrated in FIG. 16B is achieved as a consequence of the scroll operation of a user, it is considered that a user has finished checking the setting items belonging to the group "PDF Security", and a user is more interested in the setting items belonging to the group "optical character recognition (OCR)" newly displayed by the scroll operation than the other setting items. According to the modification, it is possible to facilitate the checking of the setting items belonging to a group which is more interested by a user.

Figure 17A:
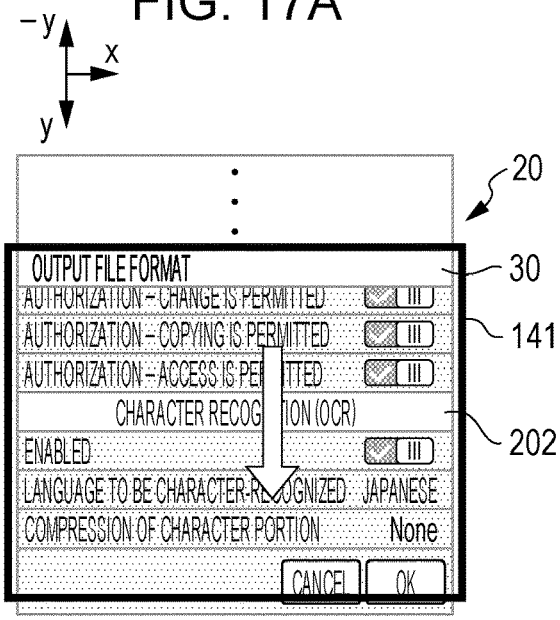
FIGS. 17A to 17C are views illustrating an example of screen transition of the list according to the modification.
Figure 17B:
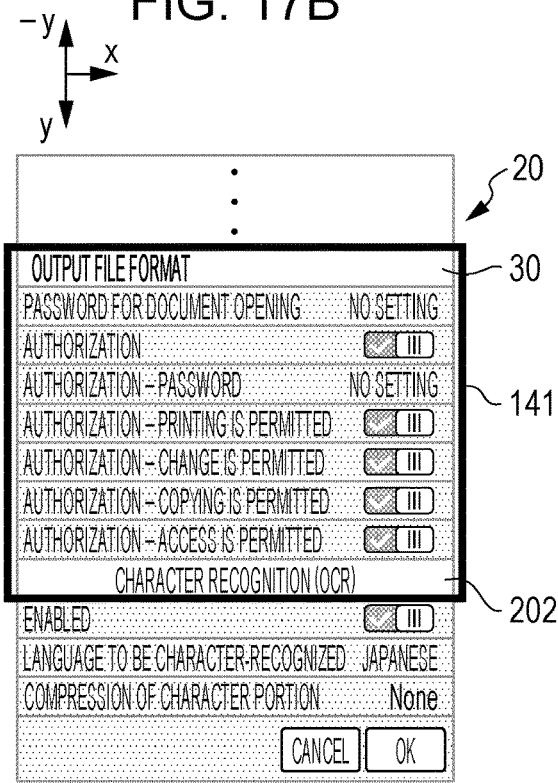
Figure 17C:
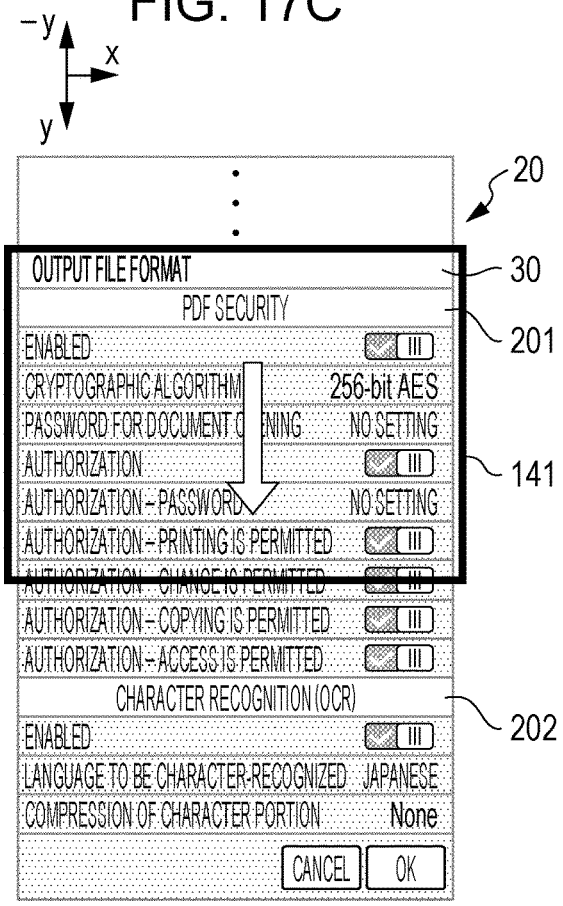

FIGS. 17A to 17C are views illustrating an example of screen transition of the list 20 according to the modification. As illustrated in FIG. 17A, the portion included in the display range 141 of the list 20 is displayed on the display 14. As illustrated in FIG. 17A, when a user performs an operation to scroll the list 20 in the y direction, the list 20 is scrolled in the y direction in response to the operation. The display range 141 contains both the title 202 the group "optical character recognition (OCR)" and the setting items belonging to the previous group "PDF security". In this example, the size of the display area for the information on the group "PDF security" is greater than the size of the display area for the information on the group "optical character recognition (OCR)". In this case, as illustrated in FIG. 17C, the list 20 is scrolled in the y direction until the title 201 at the head of the group "PDF security" is moved to the upper end of the display range 141 excluding the fixed image 30. Thus, the display area of the group "PDF security" is increased. In contrast, the group "optical character recognition (OCR)" is hidden, and its display area is eliminated. This is because when the state illustrated in FIG. 17B is achieved as a consequence of the scroll operation of a user, it is considered that the user has finished checking the setting items belonging to the group "optical character recognition (OCR)", and the user is more interested in the setting items belonging to the group "PDF security" newly displayed by the scroll operation than the other setting items. According to the modification, it is possible to facilitate the checking of the setting items belonging to a group which is more interested by a user.

In the exemplary embodiment described above, the structure of the list 20 is not limited to the above-described example. For instance, the head of each group is not necessarily provided with a title. The head of each group may be provided with an image indicating information other than the title. The head may be provided with the first one of the setting items. The items included in the list 20 are not limited to the setting items indicating the details of setting of the functions of the display device 10. The list 20 may include any items as long as the items are arranged in order.

In the exemplary embodiment described above, the structure of the display device 10 is not limited to the above-described example. The display device 10 may have another hardware structure. The hardware structure of part of the display device 10 may be provided in another device. Alternatively, part of the function of the display device 10 may be implemented by another device. In the exemplary embodiment, the display device 10 is used as the display control device according to the exemplary embodiment of the disclosure. However, the display control device according to the exemplary embodiment of the disclosure is not limited to the display device 10. For instance, the display control device may include the same controller 11, memory 12, and storage 13 as in the display device 10, but may not include the display 14 and the operational interface 15. In this case, the display 14 and the operational interface 15 may be provided externally of the display control device.

In the exemplary embodiment described above, the steps of the processing performed in the display device 10 are not limited to the example described above. The steps of the processing may be switched to each other as long as no contradiction occurs. The exemplary embodiment of the disclosure may be provided as a method including the steps of the processing performed in the display device 10.

The exemplary embodiment of the disclosure may be provided as a program to be executed in the display device 10. The program may be downloaded via a communication line such as the Internet, or may be provided recorded on a computer-readable recording medium, such as a magnetic recording medium (for instance, a magnetic tape and a magnetic disk), an optical recording medium (for instance, an optical disk), and a semiconductor memory.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A display control device comprising:
 a processor programmed to:
  when part of a list in which a plurality of setting control icons that control program settings are arranged in order is displayed on a display, and an operation is performed on a target icon included in the plurality of setting control icons to change a program setting, obtain operational information indicating the operation; and when the operational information to change the program setting is obtained, scroll the list to display one or more related setting control icons related to the target icon of the plurality of setting control icons.

2. The display control device according to claim 1, wherein the one or more related setting control icons include a first related setting control icon that is another setting control icon belonging to a target group which is part of the plurality of setting control icons, and to which the target icon belongs.

3. The display control device according to claim 2, wherein the plurality of setting control icons are arranged in order in a direction from one end of a screen of the display to another end of the screen, and the processor is programmed to scroll the list to a position where the first related setting control icon is displayed at the one end or the other end of the screen.

4. The display control device according to claim 3, wherein the one or more related setting control icons include a plurality of first related setting control icons, including the first related setting control icon, and which provide a plurality of other setting control icons belonging to the target group to which the target icon belongs, and the processor is programmed to scroll the list to a position where a first one of at least one of the one or more related setting control icons included in the plurality of first related setting control icons and subsequent to the target icon in the order is displayed at the one end or the other end of the screen.

5. The display control device according to claim 4, wherein the one or more related setting control icons include a second related setting control icon which is one of the plurality of setting control icons.

6. The display control device according to claim 5, wherein the plurality of setting control icons are arranged in order in a direction from the one end of the screen of the display to the other end of the screen, and when the second related setting control icon is included in the one or more related setting control icons, the processor is programmed to scroll the list to a position where the second related setting control icon is displayed at the one end or the other end of the screen.

7. The display control device according to claim 3, wherein the one or more related setting control icons include a second related setting control icon which is one of the plurality of setting control icons.

8. The display control device according to claim 7, wherein the plurality of setting control icons are arranged in order in a direction from the one end of the screen of the display to the other end of the screen, and when the second related setting control icon is included in the one or more related setting control icons the processor is programmed to scroll the list to a position where the second related setting control icon is displayed at the one end or the other end of the screen.

9. The display control device according to claim 2, wherein when the target group to which the target icon belongs and another group are displayed vertically adjacent to each other on a screen of the display, the processor is programmed to scroll the list to increase a display area of the target group, occupied on the screen.

10. The display control device according to claim 9, wherein the one or more related setting control icons include a second related setting control icon which is one of the plurality of setting control icons.

11. The display control device according to claim 2, wherein when the target group to which the target icon belongs and another group are displayed vertically adjacent to each other on a screen of the display, the processor is programmed to scroll the list to decrease a display area of the another group, occupied on the screen.

12. The display control device according to claim 11, wherein the one or more related setting control icons include a second related setting control icon which is one of the plurality of setting control icons.

13. The display control device according to claim 2, wherein the processor is programmed to scroll the list to display the target icon and the first related setting control icon.

14. The display control device according to claim 13, wherein the one or more related setting control icons include a second related setting control icon which is one of the plurality of setting control icons.

15. The display control device according to claim 2, wherein the one or more related setting control icons include a second related setting control icon which is one of the plurality of setting control icons.

16. The display control device according to claim 15, wherein the plurality of setting control icons are arranged in order in a direction from one end of a screen of the display to another end of the screen, and when the second related setting control icon is included in the one or more related setting control icons, the processor is programmed to scroll the list to a position where the second related setting control icon is displayed at the one end or the other end of the screen.

17. The display control device according to claim 1, wherein the one or more related setting control icons include a second related setting control icon which is one of the plurality of setting control icons.

18. The display control device according to claim 17, wherein the plurality of setting control icons are arranged in order in a direction from one end of a screen of the display to another end of the screen, and when the second related setting control icon is included in the one or more related setting control icons, the processor is programmed to scroll the list to a position where the second related setting control icon is displayed at the one end or the other end of the screen.

19. The display control device according to claim 17, wherein the one or more related setting control icons include a plurality of second related setting control icons, including the second related setting control icon, and which provide a plurality of other predetermined setting control icons to be operated in association with the target icon, and when the plurality of second related setting control icons are included in the one or more related setting control icons, and fall within a screen of the display, the processor is programmed to scroll the list to a position where the plurality of second related setting control icons are displayed.

20. A display device comprising:

a display that displays part of a list in which a plurality of setting control icons that control program settings are arranged in order;

a processor programmed to:
- when an operation is performed on a target icon included in the plurality of setting control icons to change a program setting, obtain operational information indicating the operation; and
- when the operational information to change the program setting is obtained, scroll the list to display one or more related setting control icons related to the target icon of the plurality of setting control icons.

* * * * *